United States Patent
Davis et al.

(10) Patent No.: US 9,665,957 B1
(45) Date of Patent: *May 30, 2017

(54) SYSTEM AND METHOD FOR RAPIDLY ASSESSING SYSTEM COMPONENTS WITH TREND CHARTS

(71) Applicant: CA, Inc., New York, NY (US)

(72) Inventors: Kevin Davis, San Antonio, TX (US); Chinh Do, Austin, TX (US)

(73) Assignee: CA, Inc., New York, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/842,971

(22) Filed: Mar. 15, 2013

(51) Int. Cl.
*G06T 11/20* (2006.01)

(52) U.S. Cl.
CPC .................. *G06T 11/206* (2013.01)

(58) Field of Classification Search
CPC . G06F 9/45533; H04L 43/0876; G06T 11/00; G06T 11/20; G06T 11/206
See application file for complete search history.

(56) References Cited

U.S. PATENT DOCUMENTS

| | | | |
|---|---|---|---|
| 8,527,949 B1* | 9/2013 | Pleis .................. | G06F 15/7867 717/121 |
| 8,707,194 B1* | 4/2014 | Jenkins et al. ................ | 715/772 |
| 2007/0168336 A1* | 7/2007 | Ransil et al. ..................... | 707/3 |
| 2008/0177554 A1 | 7/2008 | Srinivasan et al. | |
| 2011/0238397 A1* | 9/2011 | Chen .................. | G06F 11/3672 703/13 |
| 2012/0159367 A1* | 6/2012 | Calcaterra et al. ........... | 715/771 |
| 2012/0245836 A1* | 9/2012 | White et al. .................. | 701/120 |

OTHER PUBLICATIONS

"Windows 7", released by Microsoft Corporation, on Oct. 22, 2009. pp. 1-4.*
United States Patent and Trademark Office, Non-Final Rejection issued in related U.S. Appl. No. 13/842,076, mailed Nov. 6, 2014.
United States Patent and Trademark Office, Final Rejection issued in related U.S. Appl. No. 13/842,076, mailed May 19, 2015.

(Continued)

*Primary Examiner* — Xiao Wu
*Assistant Examiner* — Chong Wu
(74) *Attorney, Agent, or Firm* — Baker Botts L.L.P.

(57) ABSTRACT

A method includes determining utilization metrics and trend data for each of a plurality of system components. The method also includes formatting for display a list comprising the plurality of system components and respective component attributes of the system components. The component attributes include the respective utilization metrics over a selected time range. The method also includes determining, using a processor, a selected system component based on a cursor position with respect to the list of system components. The method further includes, in response to determining the selected system component, formatting for display a graph indicative of the selected system component. The graph includes the trend data of the selected system component over the selected time range. The graph and the list of system components are formatted to be displayed simultaneously.

20 Claims, 4 Drawing Sheets

(56) References Cited

OTHER PUBLICATIONS

United States Patent and Trademark Office, Advisory Action issued in related U.S. Appl. No. 13/842,076, mailed Jun. 12, 2015.
United States Patent and Trademark Office, Non-Final Rejection issued in related U.S. Appl. No. 13/842,076, mailed Oct. 5, 2015.
United States Patent and Trademark Office, Final Rejection issued in related U.S. Appl. No. 13/842,076, mailed Apr. 21, 2016.
United States Patent and Trademark Office, Non-Final Rejection issued in related U.S. Appl. No. 13/842,076, mailed Oct. 7, 2016.

* cited by examiner

SYSTEM AND METHOD FOR RAPIDLY ASSESSING SYSTEM COMPONENTS WITH TREND CHARTS

BACKGROUND

The disclosure relates generally to managing system components, and more specifically, to rapidly assessing system components with trend charts.

SUMMARY

According to one embodiment of the disclosure, a method includes determining utilization metrics and trend data for each of a plurality of system components. The method also includes formatting for display a list comprising the plurality of system components and respective component attributes of the system components. The component attributes include the respective utilization metrics over a selected time range. The method also includes determining, using a processor, a selected system component based on a cursor position with respect to the list of system components. The method further includes, in response to determining the selected system component, formatting for display a graph indicative of the selected system component. The graph includes the trend data of the selected system component over the selected time range. The graph and the list of system components are formatted to be displayed simultaneously.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

Figure 1:
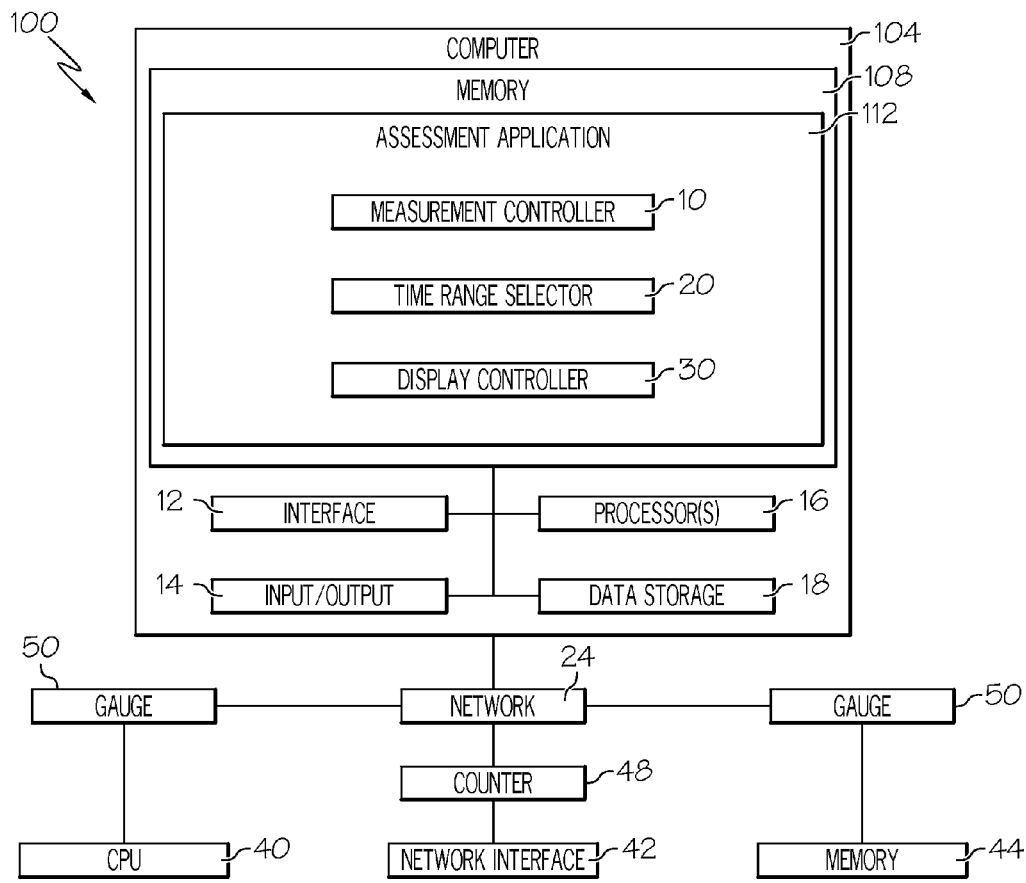
FIG. 1 illustrates a block diagram of a system for rapidly assessing system components in accordance with one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADED, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Business information technology (IT) infrastructures require cost-effective management and maintenance for optimizing and improving application delivery. Discovering inefficient resource use may increase system utilization, increase productivity, and reduce system downtime. Searching across backward looking reports and correlating resource statistics is time consuming and may lead to inefficient utilization policies or resource scheduling. Triaging problematic systems with complex network interfaces and variable processor and memory utilization rates may cause administrators to react inappropriately by implementing incorrect or inaccurate system scheduling policies. Time constraints on administrator decision making further compound such issues. Attempting to solve infrastructure performance issues by scheduling more resources or standing up additional servers at problematic sites wastes money when component bottlenecks exist in unrealized components.

A best practice of infrastructure management that has emerged is combing through utilization data in a top-n table in order to identify any transient behaviors and metric values that are increasing in severity in order to address infrastructure issues that may be impacting users. In a top-n table of 10 (e.g., where n=10) components, central processing units, (CPU) or memories, combing or drilling through utilization data may consume time and extend the minimum time to respond (MTTR) to critical utilization issues. In most IT environments, the time saved in troubleshooting such issues may directly save money in terms of, for example, lost productivity, sales or stock trades, etc., or missed service level agreements (SLA).

The teachings of the present disclosure may enable a system administrator to quickly triage underperforming or failing system components such that repairs or infrastructure adjustments may be made. In accordance with particular embodiments, the present disclosure may reduce the time required to assess system component utilization issues by as much as 90%. The present disclosure may also enable rapid assessment and configurable data collection to aid in component analyzation. The teachings of the present disclosure may further enable consumers of top-n data, or data comprising the top n elements having the highest quantities of a certain attribute, to view the elements in light of additional context data, such as minimum and maximum attribute values over a certain time period.

Referring to FIG. 1, a system 100 for rapidly assessing system components is implemented in a computer 104 (e.g., a personal computer, a server, a mobile device, or the like). System 100 may include a computer 104, network 24 and one or more of a CPU 40, a network interface 42, and a memory 44. In a particular embodiment, computer 104 is connected to other computers via network 24. The other computers include similar system components to those in computer 104, such as CPU, memory, and network interface devices. For example, other computers linked to network 24 may include one or more of CPU 40, network interface 42 and memory 44. Computer 104 and system components (i.e., CPU 40, network interface 42 and memory 44) interact in system 100 such that computer 104 may display information about one or more of the system components. Computer 104 includes an component 12, input/output 14 (e.g., one or more of a mouse, keyboard, trackball, and track pad), processor(s) 16, and a data storage 18. Computer 104 further includes a memory 108 that may run applications. For example, in the illustrated embodiment memory 108 runs an assessment application 112. Assessment application 112 includes software code objects that perform assessment operations on the system components. For example, assessment application 112 may monitor measurement devices (e.g., gauges or counters) designed to collect utilization data of each system component. Assessment application 112 may store such utilization data in a database, and may display the utilization information to users depending on various inputs (e.g., a time range selection). Assessment application 112 software code objects include a measurement controller 10, a time range selector 20, and a display controller 30. Such code objects are responsible for querying utilization data for system components from the database and generating displays.

System 100 may poll measurement devices, including gauge 50 and counter 48, at set intervals to collect utilization information. For example, gauge 50 measures utilization information for CPU 40. Application 112 measurement controller 10 polls gauge 50 for CPU 40 every 5 seconds to determine utilization information and stores the results in a database. In another example, counter 48 measures utilization information for network interface 42. In this example, network interface 42 is a network switch. Counter 48 measures traffic and data throughput through the switch. An application polls counter 48 every 5 seconds to determine utilization information and stores the results in a database. In still another example, gauge 50 measure memory 44 utilization statistics. Measurements are stored in a database and later retrieved by assessment application 112.

In another embodiment, system 100 in FIG. 1 includes assessment application 112 that is responsible for monitoring utilization information of the system components. Assessment application 112 may include measurement controller 10 that measures utilization information across an IT infrastructure. Application 112 may further include a time range selector 20 that receives a time range selection. Time range selector 20 indicates a time span for which to display utilization information for system components, and stores utilization information in one or more of memory 108, data storage 18, and a database. The system components may include one or more of CPU 40, network interface 42, memory 44, a computer, a server, a network, a router, a switch, a hub, and other computing system components. Assessment application 112 further includes a display controller 30 that displays output using processor 16 and input/output 14 (i.e. a display). Display controller 30 may display a list of the system components and attributes of each system component. For example, display controller 30 may display an average utilization of a system component over the time span selected from time range selector 20. Display controller 30 may further display a device name, and a system component name. In other embodiments, display controller 30 displays an identifier. Display controller 30 may be operable to sort the list of system components and may sort the list of system components based on input/output 14. For example, display controller 30 may display the list of system components in descending order of average utilization.

In a particular embodiment, input/output 14 includes an input cursor. Application 112 may detect events from the input cursor. For example, application 112 may detect the input cursor click on the name column in the list of system components. Accordingly, application 112 may cause display controller 30 to sort the system component list in ascending or descending order by measurement value, or alphabetically by name. Display controller 30 may further display a gauge that may include one or more of the average utilization of the selected system component, a minimum utilization of the selected system component and a maximum utilization of the selected system component. In the current embodiment, display controller 30 displays, by default, a first system component in the list of system components in the gauge. In another example, display controller 30 displays, by default, the first system component in a trend graph. Display controller 30 may be further operable to change the system component displayed in the gauge based on input/output 14. For example, display controller 30 may display attributes of a first system component in the gauge by default. If the input cursor is positioned over a second system component in the list of system components, display controller 30 may display attributes of the second system component in the gauge. In a similar embodiment, display controller 30 may display attributes of the second system component in a trend chart. Display controller 30 may display the list of system components and the gauge in one or more of a web page display and an application window.

The display controller may be configured to display both the gauge/trend chart and system component list simultaneously on one graphical user interface window. For example, application 112 is configured as a web application. When input/output 14 device hovers over a system component in the list of system components, a portion of the web application window that is visible on the display shows the selected system component gauge. In this embodiment, system 100 is configured such that gauge utilization information for each system component in the list of system components is available to the user on one web application page. In another example, application 112 is configured as a MICROSOFT WINDOWS® application. Application 112 is configured to display gauge utilization information for each system component in the list of system components on one application window.

Network 24 may comprise any wireless and/or wired network that may enable communication between computer 104 and system components. Computer 104 may include memory 108, component 12, input/output 14, processor(s) 16, and data storage 18. Other computers connected to network 24 include similar components.

Memory 108 and/or data storage 18 may include any hardware, software, firmware, or combination thereof operable to facilitate storage and retrieval of information. Input and/or output devices 14 may facilitate communication between computing systems 104 and system components and/or within a particular computing system 104 or system component. Input/output 14 may comprise any device that may be used to communicate with computing system 104.

Figure 2:
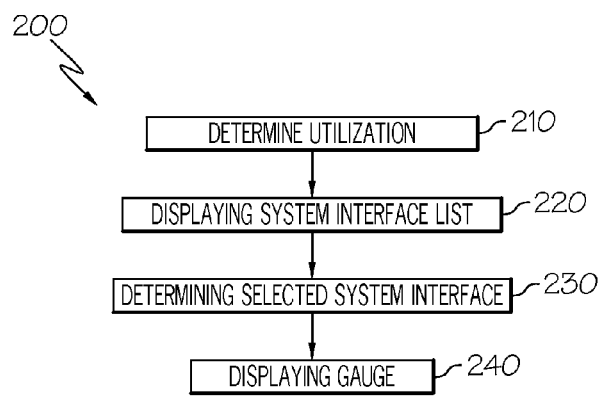
FIG. 2 illustrates a flowchart of a method for rapidly assessing system components in accordance with an embodiment.

FIG. 2 illustrates a flowchart of a method 200 for rapidly assessing system components in accordance with an embodiment. At step 210, the utilization of system components 12 is determined. Memory 108 includes an assessment application 112 that may include a measurement controller 10, time range selector 20, and display controller 30. Assessment application 112 may use utilization data from measurement controller 10 to help an organization track and/or estimate utilization of system component components. For example, in certain embodiments, system processes may use up network resources. The organization may desire to track these resources in order to gauge and/or facilitate one or more of troubleshooting and triaging system failures. In some embodiments, assessment application 112 may be operable to itemize utilization of various system components. Assessment application 112 may be operable to one or more of report and display the itemized system components to a user of computing system 104 or a user of computing systems connected to network 24.

In some embodiments, assessment application 112 may be accessed by a user of computing system 104. All or a portion of assessment application 112 may run in memory at any location on network 24 via a web component. Application 112 may further access a remote database, connected by network 24, to retrieve utilization information.

System components may be described in a software object in assessment application 112. For example, system components in system 100 are described in a system component object stored in memory 108. One or more of utilization information, component name, and device name may be stored in the system component object. System component objects may be associated with an infrastructure category, such as network resource, server, mobile device, or thin client, and may be displayed based on their categorization. For example, a user may select an option in assessment application 112 to view all processor utilization rates for all servers at a specific site. Assessment application 112 queries the utilization database for all such system components and displays the list of returned results. Such categorization additionally allows for other metrics to be captured. The system component objects may store, for example, component utilization information, and may process calculations (e.g., taking the average, and finding the minimum and maximum of a set) on the utilization information for display purposes. In one embodiment, the system component objects may calculate utilization attributes such as one or more of minimum utilization, maximum utilization and average utilization of the system component.

Measurement controller 10 may communicate through network 24 to contact system components and may poll system component measurement devices to determine utilization statistics. In another embodiment, measurement controller 10 may query a database for new system components, and may create system component objects for each detected system component. Measurement controller 10 may read utilization information from the database into memory 108.

At step 220, display controller 30 may display a list of system components that include system component attributes. In certain embodiments, system component attributes include identification and utilization attributes. For example, display controller 30 may display a table with rows. Each row contains system component information from a system component object. Display controller 30 further displays columns in the table including a device name column, a name column, and an average utilization column. The device name column may contain the name of the device that each system component is located in. The name column may contain the name of each system component, and the average utilization column may contain a bar chart that may indicate the percentage of average utilization of the system component. In another example, display controller 30 may display a column displaying the current utilization of a processor.

The list of system components may comprise one or more of a table view or grid view of the system component list. The system component list may be sorted in descending order according to average utilization values by default. The user may sort the list of system components by any attribute in the list of system components.

At step 230, a system component from the list of system components may be determined to be selected. By default, the selected system component may be the first system component in the list of system components. The selected system component may be modified by changing the position of input/output 14 (e.g., input cursor) with respect to the system components in the list of system components. For example, by default a first system component in the list of system components may be selected. The user may change the selected system component to a second system component by moving the input cursor such that the input cursor hovers over the second system component. The first system component may be selected again by positioning the input cursor over the first system component, or by positioning the input cursor outside the list of system components. In this example, positioning the input cursor outside the list of system components causes the default system component to become selected.

At step 240, a gauge may display attributes of the selected component. For example, a gauge depicts a utilization range of a first CPU 40 in a list of system components. The gauge may still depict the first CPU 40 in the list of system components when the input cursor hovers over the first system component in the list. The gauge includes a minimum percentage utilization, a maximum percentage utilization and a current average percentage utilization. If the input cursor is positioned over a second system component in the list of system components, the gauge may depict utilization information for the second CPU. The gauge and list may be displayed with a small footprint, such that a system administrator may easily and quickly scan through the results on one or more of an application window or web page. For example, display controller displays both the gauge and the list of system components on the same web page. The system administrator may quickly hover over each system component such that the minimum utilization, maximum utilization, and average utilization of each system component may be viewed in the gauge display, without changing views, windows or displays.

The gauge may further contain attributes of one or more of system components and system component utilization statistics. For example, one gauge contains a sweep bar that indicates the minimum and maximum range of utilization for the selected system component. The sweep bar is represented beneath the gauge tick marks to indicate a path that the gauge needle has traveled. For example, on a gauge with a range from 0% to 100% (e.g., tick marks at every percentage and longer tick marks every 10th tick), a gray sweep bar may indicate utilization rates between 20% and 40%, while the gauge needle indicates a 37% average utilization. The gauge may additionally comprise digital readouts displaying system component attributes. For example, the gauge may comprise a digital readout of the minimum, maximum and average utilization for the selected system component.

In other embodiments, step 240 may display a trend graph that depicts utilization information for a first system component in the list of system components over the selected time range. If a user hovers over the second system component in the list of system components, the trend graph may depict the second system component. In this embodiment, if the user were to mouse-over each row of the list of system components, the trend graph will change to the corresponding component's utilization data. When the mouse leaves the list of system components, the trend chart returns to showing the data for the first system component.

The trend graph may display utilization history for the selected system component. Such a graph allows system administrators to determine if utilization bottlenecks are waxing, waning, or constant. For example, a system administrator consults system 100 in a system component triage effort when users complain of current slow performance. A network interface in the list of system components reports a high average utilization. The system administrator positions the input device over the network interface in order to display the trend chart for that interface, but the trend chart indicates high previous utilization of the network interface is the cause of the high average utilization rate. As a result, the system administrator eliminates the network interface from the system component triage effort without leaving the current application window/view.

Figure 3:
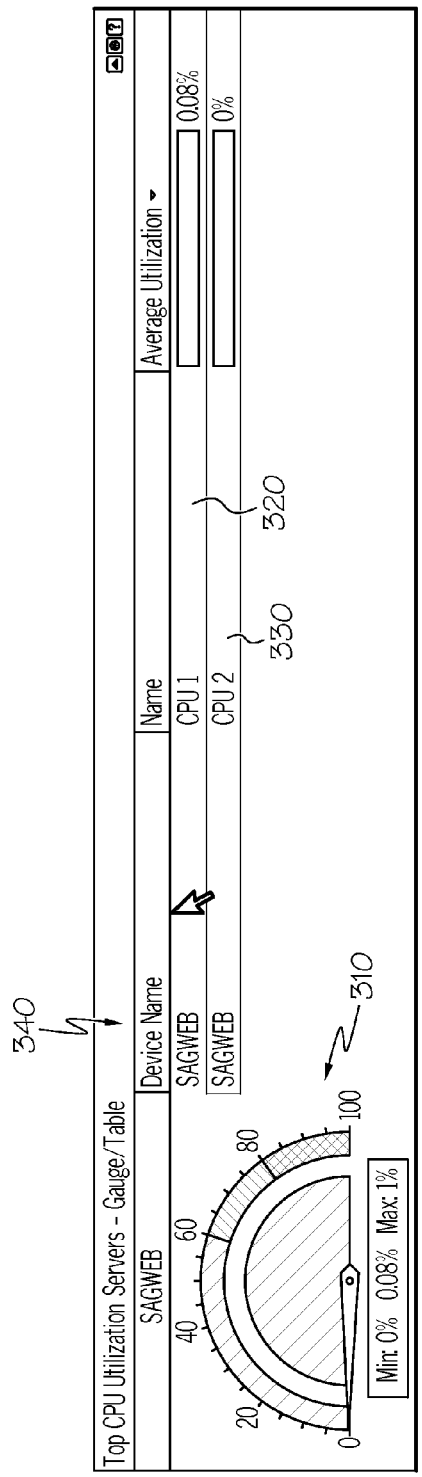
FIG. 3 illustrates a gauge display in the system for rapidly assessing system components in FIG. 1.

FIG. 3 illustrates a gauge display in the system for rapidly assessing system components in FIG. 1. In the depicted embodiment, a gauge graph 310 depicts a first CPU (CPU1) 320 by default and when there is a mouse-over (e.g., hover-over) of CPU1 320 of a list of system components 340. The minimum and maximum utilization values are displayed below gauge 310, along with a current average utilization value. A small gray sweep bar may be displayed behind the needle of gauge 310. The sweep bar may be a strong visual representation that the utilization may be consistent during the selected time interval.

Figure 4:
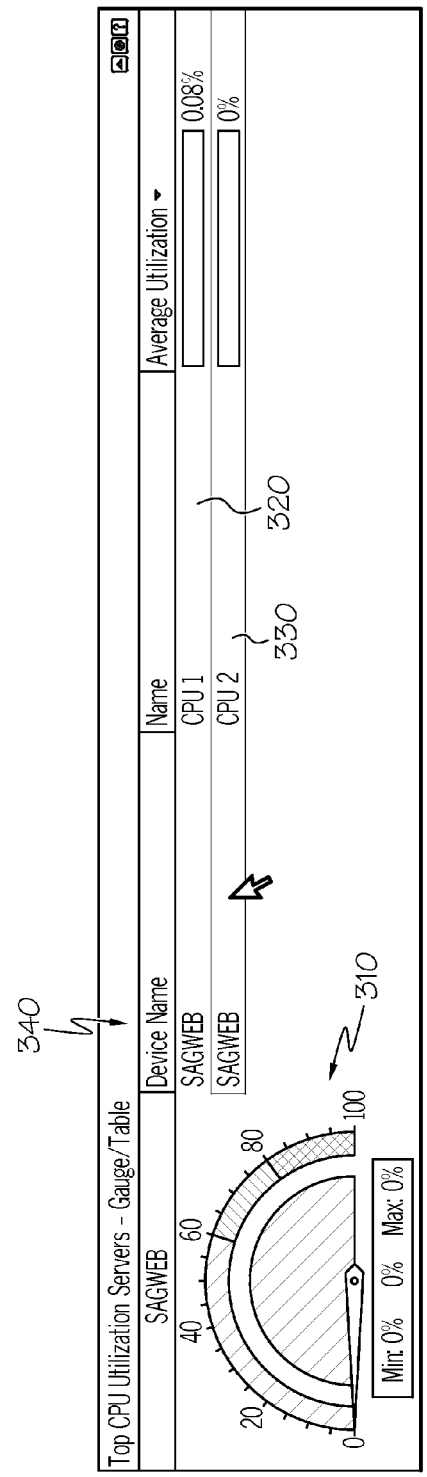
FIG. 4 illustrates a gauge display when an input cursor is positioned over a second row.

FIG. 4 illustrates a gauge 310 display when input cursor is positioned over a second row. In this embodiment, a combination table and gauge graph may depict a second CPU (CPU2) 330 due to a mouse-over of row 2. The reported minimum, maximum and average utilization values may be reported below gauge 310. In certain embodiments, no gray sweep bar may be seen due to the value of these attributes. The absence of a gray sweep bar may represent that the value may have been consistent during the selected time interval. If a user hovered over each row of the table, the gauge graph may change to the corresponding CPU's data. If a user moves the input cursor outside the table, the gauge 310 returns to displaying the data for CPU1 320 (e.g., top row of table or row 1). Such displays may enable a system administrator to quickly comb through system component data, and respond to utilization inefficiencies that such gauges may indicate.

Figure 5:
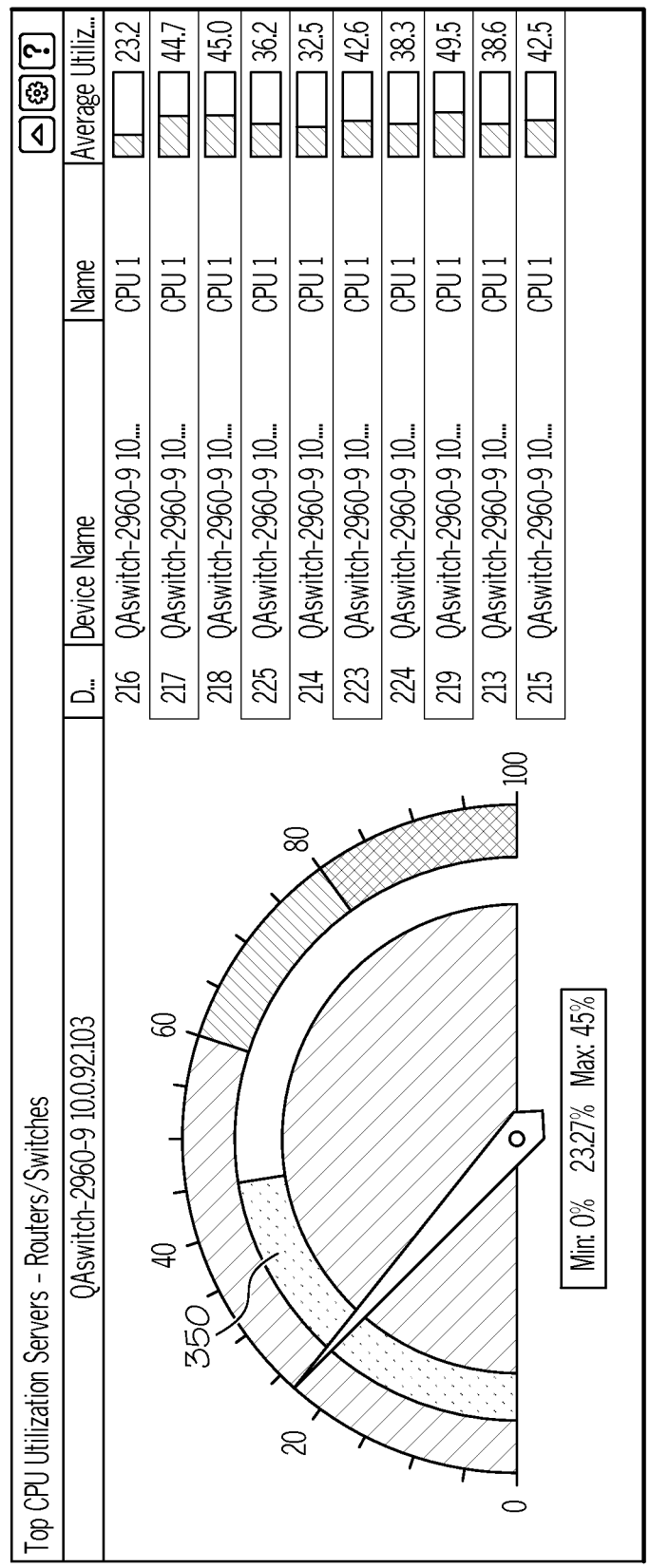
FIG. 5 illustrates a gauge display with ten items.

FIG. 5 illustrates a gauge display with ten items. In this example, a combination table and gauge graph depicts ten CPUs. By default the gauge may show data for row 1 (i.e., CPU1). The gauge indicates a large gray sweep area 350. Such a sweep area indicates that the utilization values may have changed significantly during the selected time interval (e.g., large transience which may be indicative of a performance issue). The minimum, maximum, and average utilization values are displayed below the gauge display.

Figure 6:
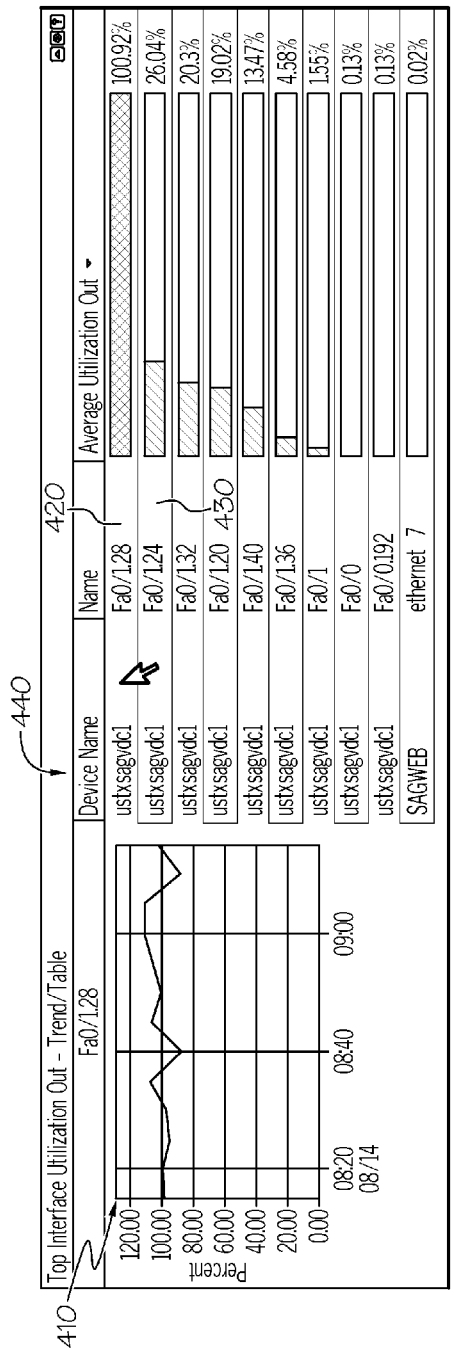
FIG. 6 illustrates a trend graph display in the system for rapidly assessing system components in FIG. 1.

FIG. 6 illustrates a trend graph 410 display in the system for rapidly assessing system components in FIG. 1. In the depicted embodiment, trend graph 410 depicts a first network interface 420 by default and when there is a mouseover of network interface 420 in a list of system components 440. Trend graph 410 displays utilization statistics of the selected component during the selected time interval. The content of trend graph 410 may change to reflect the selected system component. For example, if a user hovers the input cursor over a second system component in the list of system components, trend graph 410 may change to display the second system component utilization over the selected time period.

Trend graph 410 may display continuous utilization information over the selected time period. Such a display may assist system administrators in quickly diagnosing utilization issues, and determining whether component issues may be getting worse. Alternatively, trend graph 410 may provide information that suggests a component with a high average utilization rate over the selected time period is not the cause of an immediate performance issue. For example, when diagnosing a current performance issue a system administrator consults the system component utilization display. If network interface 420 in the list of system components indicates a high average utilization rate in the bar chart display, the system administrator may investigate network interface 420 in more depth. In method 200, system administrator may quickly consider more context information by using the input cursor to hover over network interface 420 in the list of system components, and may cause network interface 420 to become the selected system component. In certain embodiments, method 200 displays trend graph 410 that displays utilization information over the selected time period for the selected system component, which in this example is network interface 420. The system administrator may use the information displayed in trend graph 410 to determine that network interface 420 is not the cause of the current performance issue. The high average utilization statistics may have been caused by sporadic high utilization rates earlier in the day or measurement period. Thus, method 200 may enable system administrators to quickly add context to sometimes misleading average utilization statistics.

Figure 7:
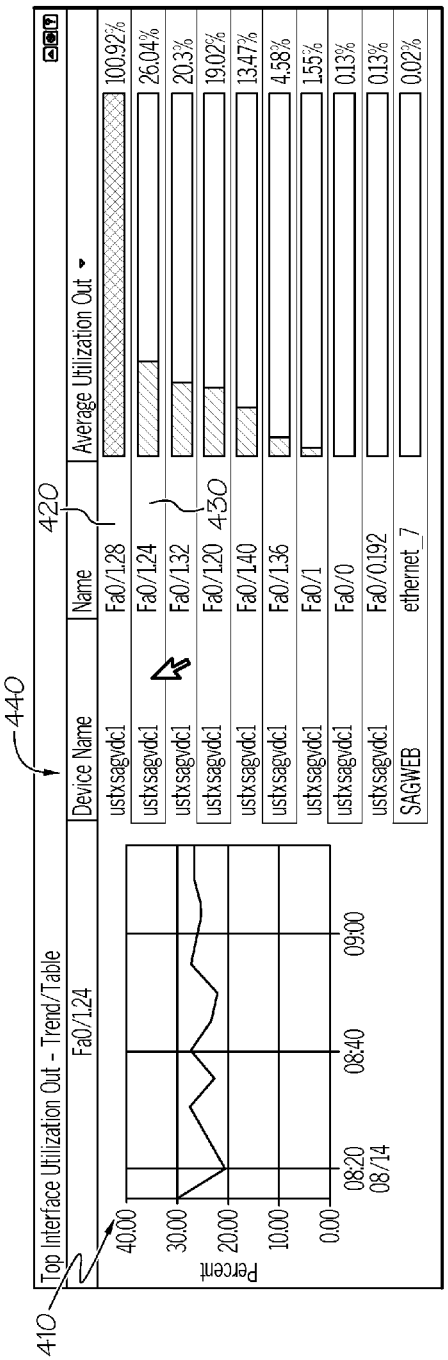
FIG. 7 illustrates a trend graph display when an input cursor is positioned over a second row.

FIG. 7 illustrates a trend graph 410 display when an input cursor is positioned over a second row. In certain embodiments, a combination table and trend graph depicts a second network interface 430 due to a mouse-over of row 2. As the user hovers over each row of the table, trend graph 410 changes to display the corresponding network interface's utilization data. If a user moves the input cursor outside the table (i.e., does not hover over any row), trend graph 410 would return to displaying the data for network interface 420 (e.g., top row of table or row 1). Such displays may enable a system administrator to quickly comb through system component data, and respond to utilization inefficiencies that such trend charts indicate.

Prior to the present disclosure, top-n views that may have reported the value of metrics may have only reported a single "bar chart" value that may have summarized the average value of the data. For example, a top-n list of component utilization attributes were displayed as follows:

Component GigabitEthernet0/0-75%
Component GigabitEthernet0/3-73%
Component GigabitEthernet0/2-71%

While this presentation of data permitted ranking components in order of average utilization, it did not provided any additional context information to the consumer of the data as to whether or not the utilization increased, decreased, displayed transient peaks/valleys, or remained steady. Thus, a user could not attain a contextual understanding as to whether the problem may have been waxing, waning, or may have been constant. That is to say, the displayed average value could be due to an issue that may have occurred early in the time interval that was used to calculate the value. In other words, the average value is less significant when the utilization subsides across the time interval. Alternatively, the average value may reflect a utilization issue that is occurring currently, and is more critical than the average value reflects.

In order to determine the significance of the value reported in the top-n table, the user navigate to, or drill down to, an additional view that shows additional data. The additional view may include a trend chart or a table that includes minimum and maximum values with respect to the average utilization and the time period. A best practice of managing infrastructures is to comb the data in top-n tables such that transient behaviors and increasing metric values may be identified, so that issues that are impacting users may be addressed.

For example, in a top-n list of components, where n=10, it may take several minutes to comb through and drill down to additional views to view the relevant data. It may take a system administrator a considerable amount of time to understand the context and significance of each value, and consequently may extend the MTTR as the administrator may search for system components with current utilization problems.

This disclosure combines the top-n table with standard graphs and displays relevant metrics with a gauge chart that changes to display a new gauge chart for each row of a table as a user mousse-over each row. The gauge may also display the minimum and maximum values of the underlying utilization data for the system component, and may further portray the minimum and maximum ranges with a gray sweep line beneath a gradient line. Thus, the user can quickly comb the data and may determine if the context of the reported value constitutes a significant performance condition of the targeted item. The user may immediately determine where the current average value falls with respect to the observed minimum and maximum values for each row of the table in a manner that is clear and visually appealing. For example, if the component requires attention due to the metric's current value with respect to the gauge's minimum and maximum values (e.g., the current value may be close to the maximum value or upper bounds) the user may quickly drill down from the table to a web page that contains additional information about the item.

Improvements were observed with the method in the disclosure. In one experiment, the amount of time required to assess system components using other systems took up to 10 times longer to comb through top-n tables in NPC 6.x and at least as much time in other systems. Thus, the present disclosure may significantly reduce the time it takes to respond (e.g., MTTR) to system issues, and may reduce the cost associated with loss of productivity, sales, stock trades, or SLAs.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   determining first utilization metrics and first trend data for each of a plurality of system components comprising computer processors;
   formatting for display on a web page a list comprising the plurality of system components and respective component attributes of the system components,
   the component attributes comprising the respective first utilization metrics over a first time range, the first time range comprising the range of time from a first start time to a first end time,
   wherein, by default, the plurality of system components are formatted to be displayed in descending order of the respective component attributes of the system components;
   receiving an indication that a cursor hovers over one system component in the list of system components, the system component that the cursor hovers over being a selected system component; and
   in response to receiving an indication that the cursor hovers over the selected system component:
   determining second utilization metrics and second trend data for the selected system component; and
   formatting for display on the webpage a graph indicative of the selected system component, the graph comprising the second trend data of the selected system component over a second time range, the second time range comprising the range of time from a second start time to a second end time, the second end time comprising the time at which the cursor hovers over the selected system component,
   wherein the graph and the list of system components are formatted to be displayed on the webpage simultaneously.

2. The method of claim 1, wherein determining the first utilization metrics and first range data comprises:
   receiving a plurality of packet counts from a measurement device, each packet count respectively indicating a number of data packets transferred through the measurement device at a specified time;
   generating the first utilization metrics as a function of time based on the packet counts; and
   integrating the first utilization metrics over the first time range to produce the first trend data.

3. The method of claim 1, wherein determining the first utilization metrics and first trend data further comprises:
   storing the plurality of packet counts in a remote database via a network; and
   querying the remote database for packet counts corresponding to the first time range.

4. The method of claim 1, wherein determining the selected component based on whether the cursor hovers over one system component in the list of system components comprises determining that a first system component in the list of system components is the selected system component, in response to determining that the cursor hovers over none of the system components in the list of system components.

5. The method of claim 1, wherein the component attributes further comprise average utilization and the list of system components is formatted to be displayed in descending order of the average utilizations, where each system component in the list of system components is formatted to be displayed next to its respective average utilization.

6. The method of claim 1, wherein determining first utilization metrics for each of the plurality of system components further comprises:
   measuring traffic and data throughput through a network switch; and
   determining first utilization metrics from the measured traffic and data throughput.

7. The method of claim 1, wherein the plurality of system components are formatted to be displayed in descending order of values of a first component attribute, and wherein the method further comprises:
   receiving from a user an input selecting a second component attribute to be displayed;
   determining a plurality of third utilization metrics and third trend data for each of the plurality of system components;
   formatting for display a list comprising the plurality of system components and respective second component attributes, the second component attributes comprising the respective third utilization metrics over a third time range, the third time range comprising the range of time from a third start time to a third end time, wherein the plurality of system components are formatted to be displayed in descending order of the respective second component attributes of the system components.

8. The method of claim 1, wherein the list of system components is formatted for display in a grid view.

9. The method of claim 1, wherein the plurality of system components comprise computer servers, and wherein the utilization metrics comprise utilization rates of the computer processors and memory utilization rates.

10. A computer configured to access a storage device, the computer comprising:
   a processor; and
   a non-transitory, computer-readable storage medium storing computer-readable instructions that, when executed by the processor, cause the computer to perform:
      determining first utilization metrics and first trend data for each of a plurality of system components;
      formatting for display on a web page a list comprising the plurality of system components and respective component attributes of the system components,
      the component attributes comprising the respective first utilization metrics over a first time range, the first time range comprising the range of time from a first start time to a first end time,
      wherein, by default, the plurality of system components are formatted to be displayed in descending order of the respective component attributes of the system components;
      receiving an indication that a cursor hovers over one system component in the list of system components, the system component that the cursor hovers over being a selected system component; and
      in response to receiving an indication that the cursor hovers over the selected system component:
         determining second utilization metrics and second trend data for the selected system component; and
         formatting for display a graph indicative of the selected system component, the graph comprising the second trend data of the selected system component over the second time range, the second time range comprising the range of time from a second start time to a second end time, the second end time comprising the time at which the cursor hovers over the selected system component,
      wherein the graph and the list of system components are formatted to be displayed simultaneously.

11. The computer of claim 10, wherein determining the first utilization metrics and first trend data comprises:
   receiving a plurality of packet counts from a measurement device, each packet count respectively indicating a number of data packets transferred through the measurement device at a specified time;
   generating the first utilization metrics as a function of time based on the packet counts; and
   integrating the first utilization metrics over the first time range to produce the first trend data.

12. The computer of claim 10, wherein determining the first utilization metrics and first trend data further comprises:
   storing the plurality of packet counts in a remote database via a network; and
   querying the remote database for packet counts corresponding to the first time range.

13. The computer of claim 10, wherein determining the selected component based on whether the cursor hovers over one system component in the list of system components comprises determining that a first system component in the list of system components is the selected system component, in response to determining that the cursor hovers over none of the system components in the list of system components.

14. The computer of claim 10, wherein the component attributes further comprise average utilization and the list of system components is formatted to be displayed in descending order of the average utilizations, where each system component in the list of system components is formatted to be displayed next to its respective average utilization.

15. The computer of claim 10, wherein determining first utilization metrics for each of the plurality of system components further comprises:
   measuring traffic and data throughput through a network switch; and
   determining first utilization metrics from the measured traffic and data throughput.

16. A non-transitory computer readable storage medium having computer readable program code embodied therewith, the computer readable program code comprising:
   computer readable program code configured to determine first utilization metrics and first trend data for each of a plurality of system components;
   computer readable program code configured to format for display on a web page a list comprising the plurality of system components and respective component attributes of the system components,
   the component attributes comprising the respective first utilization metrics over a first time range, the first time range comprising the range of time from a first start time to a first end time,
   wherein, by default, the plurality of system components are formatted to be displayed in descending order of the respective component attributes of the system components;
   computer readable program code configured to receive an indication that a cursor hovers over one system component in the list of system components, the system component that the cursor hovers over being a selected system component; and
   computer readable program code configured to, in response to receiving an indication that the cursor hovers over the selected system component:
      determine second utilization metrics and second trend data for the selected system component; and
      format for display a graph indicative of the selected system component, the graph comprising the second trend data of the selected system component over a second time range, the second time range comprising the range of time from a second start time to a second end time, the second end time comprising the time at which the cursor hovers over the selected system component,
   wherein the graph and the list of system components are formatted to be displayed simultaneously.

17. The computer readable storage medium of claim 16, wherein determining the first utilization metrics and first trend data comprises:
   receiving a plurality of packet counts from a measurement device, each packet count respectively indicating a number of data packets transferred through the measurement device at a specified time;
   generating the first utilization metrics as a function of time based on the packet counts; and
   integrating the first utilization metrics over the first time range to produce the first trend data.

18. The computer readable storage medium of claim 17, wherein determining the first utilization metrics and first trend data further comprises:
- storing the plurality of packet counts in a remote database via a network; and
- querying the remote database for packet counts corresponding to the first time range.

19. The computer readable storage medium of claim 16, wherein determining the selected component based on whether the cursor hovers over one system component in the list of system components comprises determining that a first system component in the list of system components is the selected system component, in response to determining that the cursor hovers over none of the system components in the list of system components.

20. The computer readable storage medium of claim 16, wherein the component attributes further comprise average utilization and the list of system components is formatted to be displayed in descending order of the average utilizations, where each system component in the list of system components is formatted to be displayed next to its respective average utilization.

* * * * *